United States Patent
Mathuria et al.

(10) Patent No.: US 9,249,984 B2
(45) Date of Patent: Feb. 2, 2016

(54) BASE PAN

(71) Applicant: Carrier Corporation, Farmington, CT (US)

(72) Inventors: Parag H. Mathuria, Baldwinsville, NY (US); Mithun Prabhakar, Bangalore (IN); James J. Del Toro, LaFayette, NY (US)

(73) Assignee: CARRIER CORPORATION, Farmington, CT (US)

( * ) Notice: Subject to any disclaimer, the term of this patent is extended or adjusted under 35 U.S.C. 154(b) by 134 days.

(21) Appl. No.: 13/967,423

(22) Filed: Aug. 15, 2013

(65) Prior Publication Data

US 2014/0049145 A1   Feb. 20, 2014

Related U.S. Application Data

(60) Provisional application No. 61/683,874, filed on Aug. 16, 2012.

(51) Int. Cl.
| | | |
|---|---|---|
| *F04B 17/00* | (2006.01) | |
| *F24F 13/22* | (2006.01) | |
| *B23P 15/26* | (2006.01) | |
| *F24F 13/32* | (2006.01) | |

(52) U.S. Cl.
CPC .............. *F24F 13/222* (2013.01); *B23P 15/26* (2013.01); *F24F 13/32* (2013.01); *Y10T 29/49359* (2015.01)

(58) Field of Classification Search
USPC .................. 248/637, 676, 678, 638; 417/363; 62/295
See application file for complete search history.

(56) References Cited

U.S. PATENT DOCUMENTS

| | | | |
|---|---|---|---|
| 4,993,682 A | 2/1991 | Imai et al. | |
| 5,052,530 A | 10/1991 | Shimazaki | |
| 5,306,121 A | 4/1994 | Heflin et al. | |
| 5,386,962 A | 2/1995 | Adriance et al. | |
| 5,964,579 A * | 10/1999 | Tang et al. | 417/363 |
| 5,984,101 A | 11/1999 | Zamora et al. | |
| 6,205,804 B1 | 3/2001 | da Silva | |
| 6,312,232 B1 | 11/2001 | Mori et al. | |
| 6,336,794 B1 * | 1/2002 | Kim | 417/363 |
| 6,352,247 B1 | 3/2002 | Ishikawa et al. | |
| 6,402,219 B1 | 6/2002 | Hopf et al. | |
| 6,499,714 B1 | 12/2002 | Wike | |
| 7,263,851 B2 * | 9/2007 | Yun et al. | 62/295 |
| 7,377,116 B2 | 5/2008 | Parker et al. | |
| 7,814,760 B2 * | 10/2010 | Immel et al. | 62/295 |
| 2005/0063829 A1 | 3/2005 | Hendrix | |
| 2005/0135943 A1 | 6/2005 | Kennedy et al. | |
| 2005/0257554 A1 * | 11/2005 | Yun et al. | 62/295 |
| 2005/0265857 A1 | 12/2005 | Lee et al. | |
| 2008/0149806 A1 * | 6/2008 | Yoon | 248/638 |
| 2009/0242727 A1 * | 10/2009 | Bruneau et al. | 248/638 |
| 2011/0243765 A1 | 10/2011 | Sugiyama et al. | |

* cited by examiner

*Primary Examiner* — Steven Marsh
(74) *Attorney, Agent, or Firm* — Cantor Colburn LLP

(57) ABSTRACT

An air conditioning unit is provided including a base pan having at least one hole surrounded by a first embossment including a first inclined sidewall and a first top wall. A mounting plate is positioned adjacent a portion of the base pan. The mounting plate has at least one opening surrounded by a second embossment including a second inclined sidewall and a second top wall. The at least one opening is generally aligned with the at least one hole. The second embossment overlays the first embossment such that a gap exists between the second inclined sidewall and the first inclined sidewall.

9 Claims, 5 Drawing Sheets

BASE PAN

CROSS-REFERENCE TO RELATED APPLICATIONS

This application claims the benefit of U.S. provisional patent application Ser. No. 61/683,874, filed Aug. 16, 2012, the entire contents of which are incorporated herein by reference.

BACKGROUND OF THE INVENTION

The invention relates generally to air conditioning or refrigeration systems and, more particularly, to a base pan that supports the components of such air conditioning or refrigeration systems.

Typically, a refrigerant compressor of an air conditioning unit is mounted to a base pan. Portions of the base pan have a reduced thickness as a result of thinning during the manufacturing process. During shipment, the compressor tends to vibrate more violently than during normal operation of the air conditioning unit. Such significant vibrations can lead to failure in the piping system and other system components due to the high stresses generated, particularly on the area of the base pan having a reduced thickness. Air conditioning units of this sort are shipped from the factory with the compressor "tied down" tightly against the base pan to prevent damage while the unit is in transit. However, vibration of a "tied down" compressor may still lead to failures in the air conditioning unit. In addition, tying down the compressor requires additional time when preparing the air conditioning unit for shipment and then when installing the unit to tighten and loosen the compressor, as needed.

BRIEF DESCRIPTION OF THE INVENTION

According to one embodiment of the invention, an air conditioning unit is provided including a base pan having at least one hole surrounded by a first embossment including a first inclined sidewall and a first top wall. A mounting plate is positioned adjacent a portion of the base pan. The mounting plate has at least one opening surrounded by a second embossment including a second inclined sidewall and a second top wall. The at least one opening is generally aligned with the at least one hole. The second embossment overlays the first embossment such that a gap exists between the second inclined sidewall and the first inclined sidewall.

According to another embodiment of the invention, a method of reducing the stresses on a base pan is provided including forming a plurality of holes, at least one of which is surrounded by a first embossment in a base pan. A plurality of first openings, at least one of which is surrounded by a second embossment is formed in a mounting plate. The mounting plate is positioned adjacent the base pan. The plurality of first openings are generally aligned with the plurality of holes and the at least one first embossment is generally aligned with the at least one second embossment. A gap is formed between a portion of the at least one second embossment and a portion of the at least one first embossment. A support structure mounts a compressor to the base pan.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
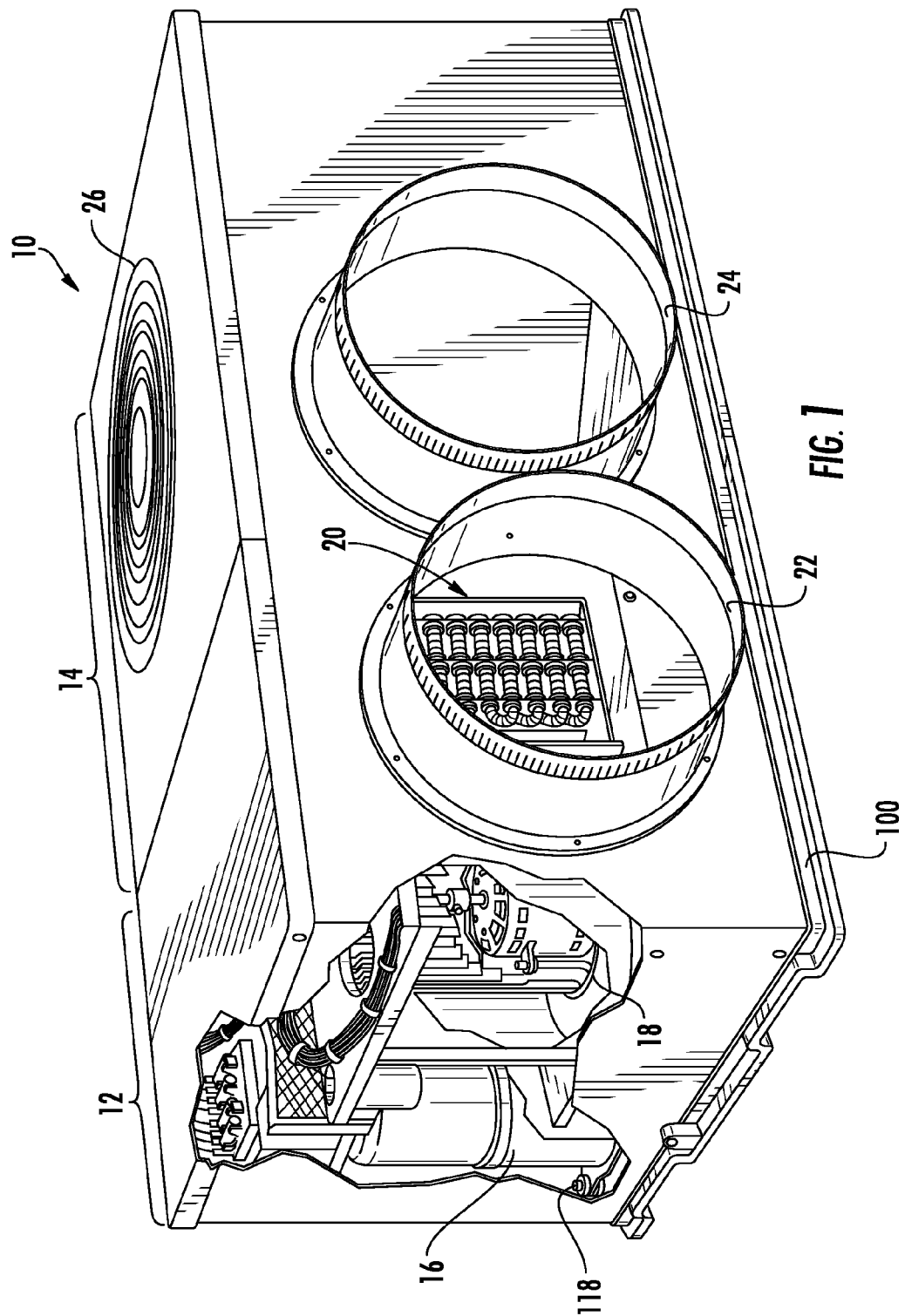
FIG. 1 is a partial cutaway diagram of an exemplary air conditioning unit.

Referring now to FIG. 1, an air conditioning unit 10 includes an indoor section 12 and an outdoor section 14 integrally attached to one another and mounted to a base pan 100. The indoor section 12 connects to air ducts that supply conditioned air to the interior space of a building, while the outdoor section 14 extends to the outside of a building. The indoor section 12 of unit 10 includes a compressor 16 for increasing the pressure of refrigerant flowing in an outdoor coil or condenser (not shown), and a blower 18 for blowing air across an indoor coil, otherwise known as an evaporator (not shown), through which cool liquid refrigerant flows.

The air conditioning unit 10 may also have heating coils 20 or other heating elements that when activated, work to supply heat to a building. When the unit 10 operates in a heating mode, air blown by the blower 18 is warmed by heating elements 20. When the unit 10 operates in a cooling mode, the air blown by blower 18 is cooled by the evaporator. Regardless of whether the unit 10 is operating in a heating mode or a cooling mode, air blown by blower 18 enters a building through a supply air duct 22. Air circulated throughout the building returns to the unit through a return duct 24. In addition to having an outdoor coil or condenser, the outdoor section 14 of the unit 10 includes an outdoor fan. The outdoor fan draws outside air into the unit 10 through a vent (not shown) and blows such air across a condenser filled with hot refrigerant. Outside air is directed out of the unit 10 through a vent 26. In this way, the condenser and fan operate to remove heat from a building.

Figure 2:
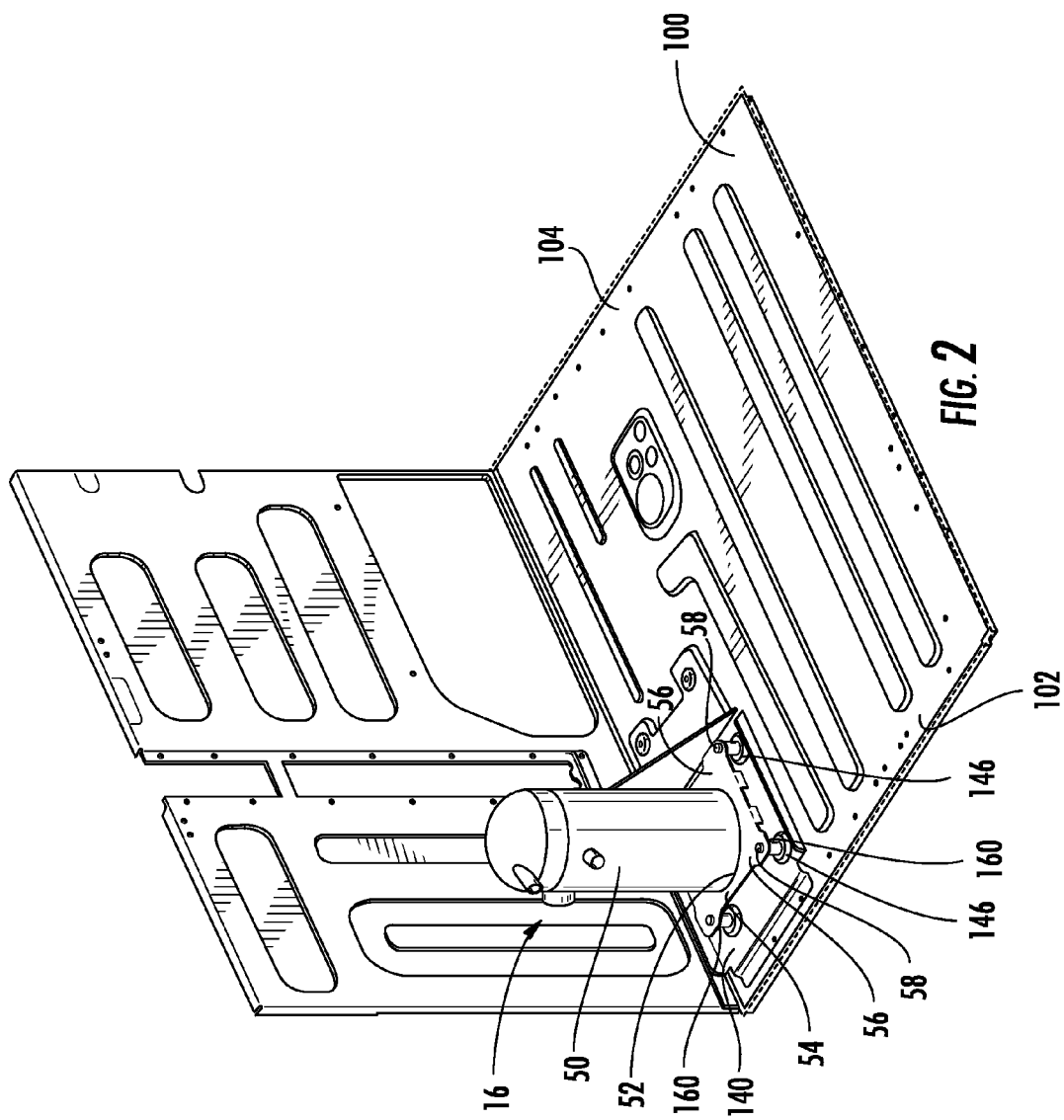
FIG. 2 is a perspective view of a portion of an air conditioning unit according to an embodiment of the invention.

FIG. 2 illustrates a portion of the air conditioning unit 10 of FIG. 1. The compressor 16 has a vertically oriented, generally cylindrical body 50. A support structure 54 is secured to an end 52 of the compressor body 50. The support structure 54 includes a plurality of outwardly projecting feet 56, each of which has an opening 58 formed therein. In one embodiment, the support structure 54 is generally rectangular and the feet 56 are disposed at each corner of the support structure 54.

In one embodiment, the base pan 100 is manufactured from a thin sheet metal material. The portion of the base pan 100 to which the compressor 16 is mounted, includes a plurality of holes 110 (FIG. 4) complementary to the openings 58 of the feet 56 of the support structure 54. Surrounding at least one of the plurality of holes 110 of the base pan 100 is a raised generally annular embossment 112 having an inclined wall 114 and a top wall 116 (best seen in FIG. 4). Though the embossments 112 illustrated in the FIGS. are generally circular, embossments of other shapes, such as ovals or rectangles are within the scope of the invention. The top wall 116 of each embossment 112 is parallel to an adjacent surface 106 of the base pan 100 (best shown in FIG. 4). A stud 118 (FIG. 1) may be inserted through each hole 110 in the base pan 100 and through an adjacent opening 58 in the support structure 54 to couple the compressor 16 to the base pan 100.

Figure 3:
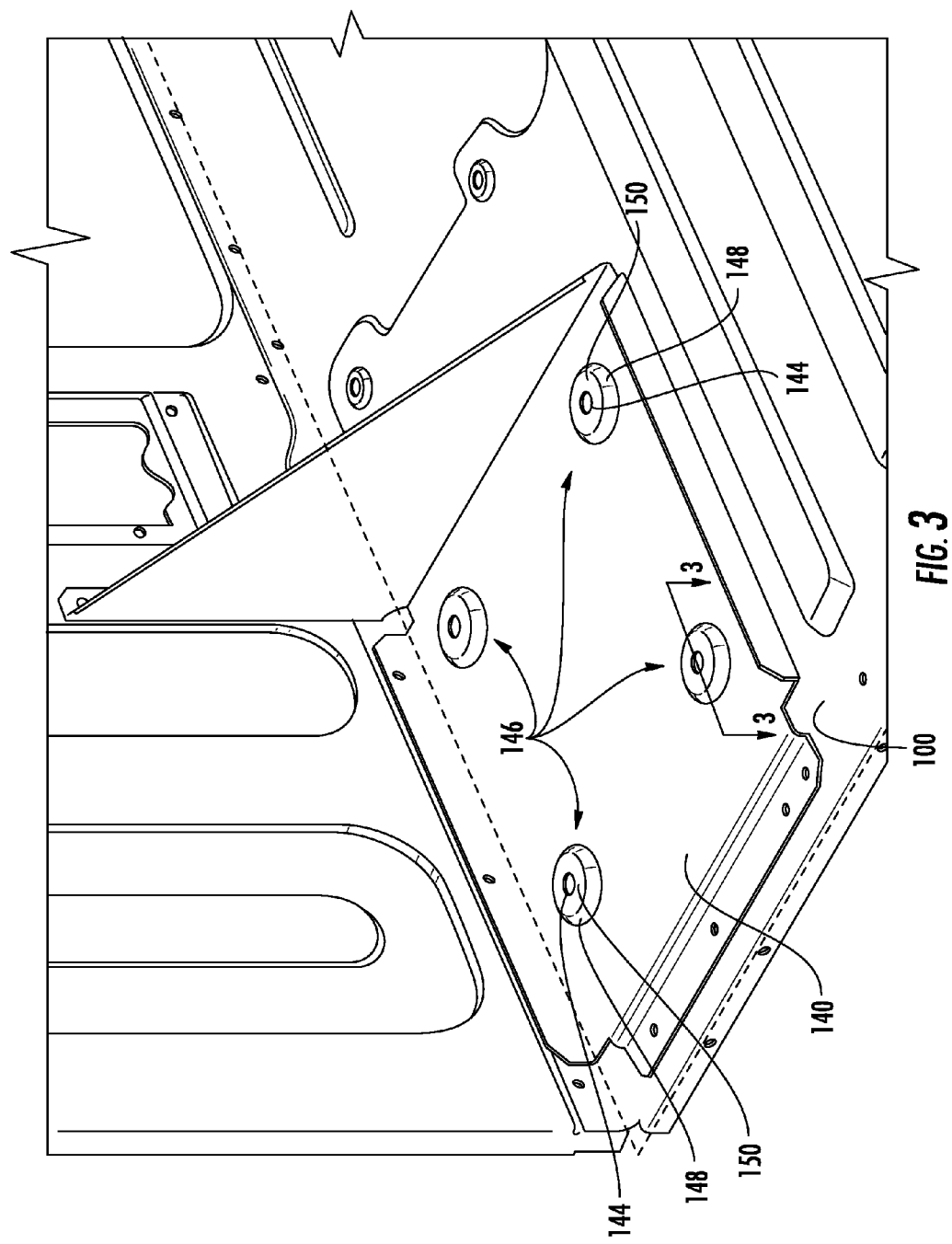
FIG. 3 is a perspective view of a portion of an air conditioning unit according to an embodiment of the invention.

During shipment of an air conditioning unit 10, two opposing ends 102, 104 of the base pan 100 are supported by rails 80. Lateral and vertical forces due to rough handling are imparted on the compressor 16 when the air conditioning unit 10 is transported. The compressor 16 has a tendency to tilt off its vertical axis, and thereby stress or possibly damage the base pan 100 or the support structure 54. To reduce the stress on the base pan 100, a mounting plate 140, illustrated in FIG. 3 may be positioned between the base pan 100 and the support structure 54 to increase the structural rigidity of the connection between the compressor 16 and the base pan 100. The mounting plate 140 may have a shape and number of holes 144 similar to the support structure 54 of the compressor 16. Each hole 144 of the mounting plate 140 is generally aligned with one of the openings 58 of the support structure 54 and the one of the holes 110 of the base pan 100. The mounting plate 140 may also include a raised generally annular embossment 146 surrounding at least one of the plurality of holes 144. Similar to the embossments 112 of the base pan 100, the embossments 146 may be any shape. The embossments 146 of the mounting plate 140 include an inclined wall 148 and a top wall 150 and are configured to overlay the embossments 112 of the base pan 100. When the compressor 16 is mounted to the base pan 100, vibration isolation pads 160 are inserted between the mounting plate 140 and the support structure 54 to prevent vibration of the compressor 16 from transferring to the base pan 100 and the other components in the air conditioning unit 10.

Figure 4:
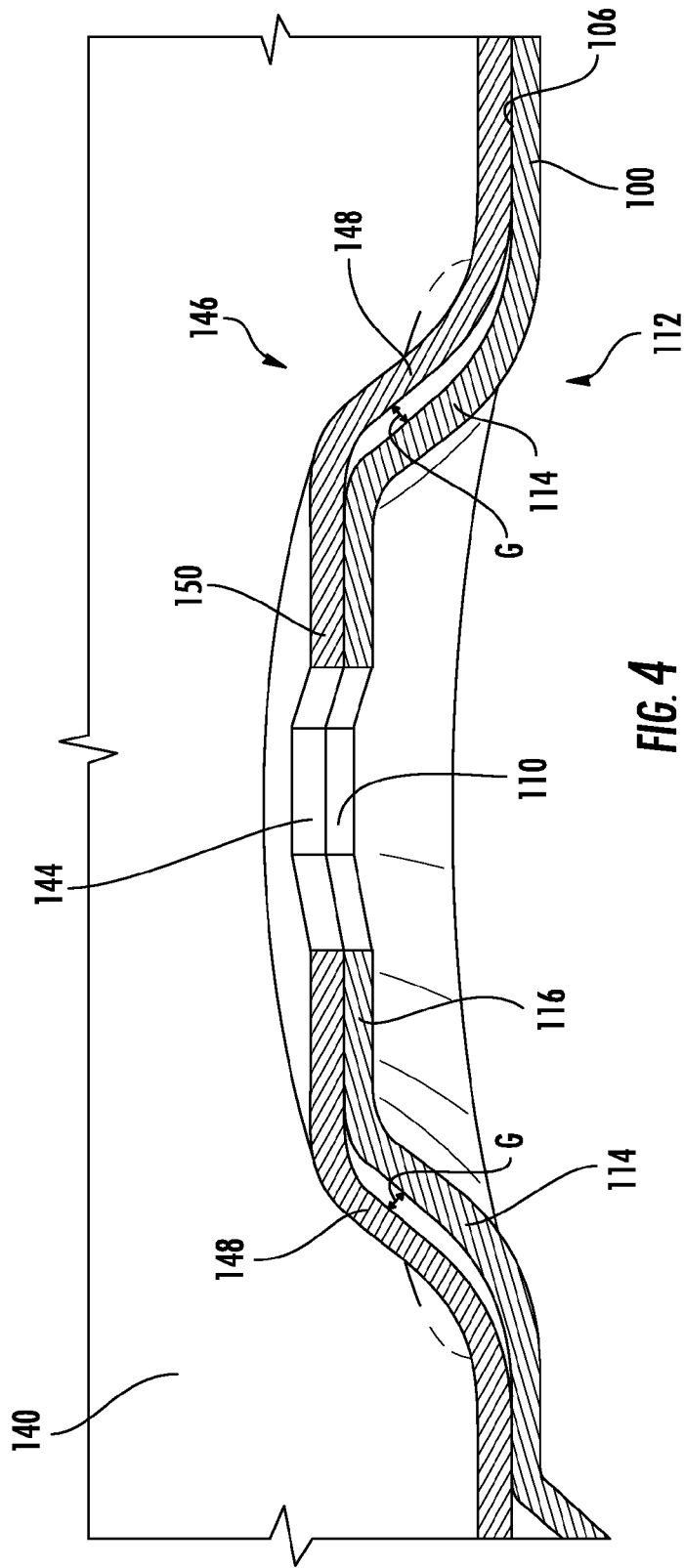
FIG. 4 is a cross-section of a mounting plate and base pan illustrated in FIG. 3.

Referring now to FIG. 4, a cross-section of the mounting plate 140 and base pan 100 is illustrated. As shown, the embossment 146 of the mounting plate 140 is complementary to the embossment 112 of the base pan 100, such that the embossment 112 of the base pan 100 fits within the embossment 146 of the mounting plate 140. The top wall 150 of the mounting plate embossment 146 is parallel to and adjacent the top wall 116 of the base pan embossment 112, such that the top walls 116, 150 are in contact. In one embodiment, a gap G exists between the inclined sidewall 148 of the mounting plate embossment 146 and the inclined sidewall 114 of the base pan embossment 112. The gap G may be any shape, and may extend around the entire periphery between the embossments 112, 146, or may extend around only a portion of the periphery between the adjacent embossments 112, 146.

To form the gap G, the angle of the inclined sidewall 148 of the mounting plate embossment 146 may be different than the angle of the inclined sidewall 114 of the base pan embossment 100. Alternatively, the angle of the inclined sidewalls 114, 148 may be equal, but the area of the top wall 150 of the mounting plate embossment 146 may be greater than the area of the top wall 116 of the base pan embossment 112. In one embodiment, both of the inclined sidewalls 114, 148 are formed at about a 45 degree angle. The gap G between the inclined sidewall 148 of the mounting plate embossment 146 and the inclined sidewall 114 of the base pan embossment 112 may have a width in the range of about 1 mm to about 3 mm. In one embodiment, the gap G has a width of about 1.33 mm.

Figure 5:
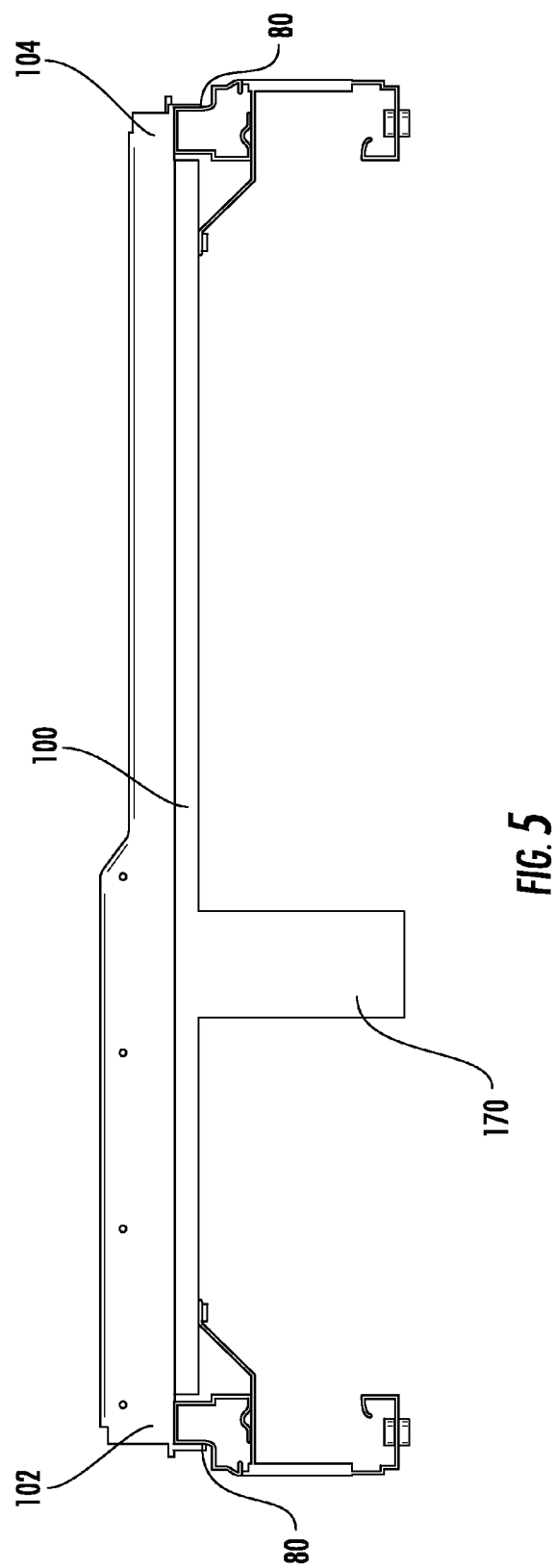
FIG. 5 is a side view of a base pan according to an embodiment of the invention.

Referring now to FIG. 5, an additional support 170, such as a piece of wood or any other material for example, may be positioned under a portion of the base pan 100 to reduce the localized stresses at the embossments 112 of the base pan 100. The support 170 may be located under the portion of the base pan 100 coupled to the compressor 16 as is known in the art.

By inserting a mounting plate 140 between the base pan 100 and the support structure 54 of the compressor 16, the stresses acting on the base pan 100, particularly on portions of the base pan having a decreased thickness are reduced. In addition, by forming a gap G between the embossments 112 of the base pan 100 and the embossments 146 of the mounting plate 140, the stresses at the junction between the top wall 116 and the inclined sidewall 114 of each embossment 112 are decreased. Consequently, the life and robustness of the base pan 100, and therefore the air conditioning unit 10, are increased.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air conditioning unit, comprising:
    a base pan having at least one hole surrounded by a first embossment including a first inclined sidewall and a first top wall; and
    a mounting plate positioned adjacent a portion of the base pan, the mounting plate having at least one opening surrounded by a second embossment including a second inclined sidewall and a second top wall, the at least one opening being vertically aligned with the at least one hole;
    wherein the second embossment overlays the first embossment such that a gap exists between the second inclined sidewall and the first inclined sidewall.

2. The air conditioning unit according to claim 1, wherein the second top wall is in contact with the first top wall.

3. The air conditioning unit according to claim 1, wherein an angle of the second inclined sidewall is equal to an angle of the first inclined sidewall.

4. The air conditioning unit according to claim 3, wherein the first inclined sidewall and the second inclined sidewall are at a 45 degree angle relative a plane of the base pan.

5. The air conditioning unit according to claim 1, wherein the gap extends about a periphery of the first embossment.

6. The air conditioning unit according to claim 1, wherein the gap may be any shape.

7. The air conditioning unit according to claim 1, wherein the gap is in the range of about 1 mm to about 3 mm.

8. The air conditioning unit according to claim 7, wherein the gap is about 1.33 mm.

9. The air conditioning unit according to claim 1, further comprising an additional support positioned on a side of the base pan opposite the mounting plate.

* * * * *